July 25, 1961  E. H. TUBBS  2,993,323
MACHINE FOR HARVESTING BERRIES
Filed Nov. 6, 1958  6 Sheets-Sheet 1

INVENTOR.
Elton H. Tubbs,
BY John Powers.
ATTORNEY.

July 25, 1961  E. H. TUBBS  2,993,323

MACHINE FOR HARVESTING BERRIES

Filed Nov. 6, 1958  6 Sheets-Sheet 2

INVENTOR.
Elton H. Tubbs,
BY John Lowers
ATTORNEY.

July 25, 1961  E. H. TUBBS  2,993,323
MACHINE FOR HARVESTING BERRIES
Filed Nov. 6, 1958  6 Sheets-Sheet 3

INVENTOR.
Elton H. Tubbs,
BY
ATTORNEY

United States Patent Office 2,993,323
Patented July 25, 1961

2,993,323
MACHINE FOR HARVESTING BERRIES
Elton H. Tubbs, 162 N. Portage, Westfield, N.Y.
Filed Nov. 6, 1958, Ser. No. 772,361
12 Claims. (Cl. 56—330)

The subject of this invention is a machine for harvesting berries from bushes (or trees) planted in parallel rows.

Berries which grow on bushes, trees or vines, such, for example, as currants, cherries, raspberries, blackberries, blueberries and grapes (for use in commerical processing operations), when in prime condition may be readily shaken from the limbs or boughs by which they are carried. The invention utilizes this fact and proposes a machine having limb shaking features and which will garner a crop of such berries with great economy in comparison with hand picking.

One object of the invention is to provide a small, lightweight, and inexpensive machine which may be readily towed to and from the berry patch or orchard by a tractor or truck, which is self-propelled between adjacent rows of bushes or trees in a series of steps controlled by an operator as to duration and extent, and which carries a multiple series of limb shaking units, each under the control of an individual operator.

Another object is to provide a machine in which the limb shaking units are suspended from supporting elements which are removably mounted upon the travelling frame of the machine and, as removed from the frame, may be collapsed into a small compass such that they may be supported by brackets provided at one side of the machine, thereby to present no obstacles to the movement of the machine when being towed, the limb shaking units being readily mountable in operative positions when their use is required.

Another object is to provide a machine in which the limb shaking units include shaking heads and which has marked facility in the rapid operative positioning of the shaking heads, such facility involving the mounting of the supporting elements for unrestricted pivotal movement about vertical axes and the suspension of the shaking heads from horizontal legs of the supporting elements in a manner such that the shaking heads may readily and quickly be applied to any of the limbs of the bushes, regardless of the particular direction of the limb and its particular elevation above the ground.

Another object is to provide a machine in which the operation of each limb shaking head is effected by an associated motor preferably an electric motor, and appropriate gearing under the immediate control of the laborer assigned to the head, in which the operation of the heads imposes no arm-tiring work upon the laborer, and in which the shaking operation involves a series of short strokes of extremely rapid character, the berries being dislodged from the bushes in the order of one or two seconds and the entire operation of positioning the shaking head and effecting its operation being completed in the order of five seconds.

Another object is to provide a machine in which the limb shaking heads, their associated motors and gearing and the handle for positioning the shaking heads together with the manually operated switch which controls the operation of the motors are combined in a unitary structure which is supported by a helical spring of retractile character from the horizontal leg of the associated supporting element in a manner such that the supporting spring may readily be moved lengthwise of the leg, may also be readily moved in any angular direction and may be stretched to any extent necessary for the application of the shaking head to the limb from which the berries are to be shaken.

With the above objects in view the characterizing features of the invention, which may be resolved into sundry novel combinations of cooperating elements as set forth in the claims, are summarized as follows: (1) A light rectangular wheel supported frame, the propulsive power being applied to a wheel at one end of the frame and the wheels at the opposite end of the frame being mounted for steering availability; (2) a generator driven by a relatively lightweight internal combustion engine constructed to charge a six or eight volt storage battery which supplies current for the propulsion of the wheeled frame and, when the motors for the operation of the berry shaking heads are electric motors as is preferred, which also supplies the current for their operation; (3) a motor operating on six or eight volt direct current and geared to the wheel to which propulsive power is to be applied; (4) booms of inverted L-shaped form as elements of the limb shaking features and which in each instance have a vertical leg which is pivotally mounted on the frame and a horizontal leg projecting from the upper end of the vertical leg; (5) elements carried by the frame, preferably upright tubular standards, which provide pivotal mountings for the vertical legs of the booms; (6) the preferred construction of the booms in which the horizontal leg is pivoted to the vertical leg whereby the legs may have an operative or collapsed relation and a supporting brace extends between the legs and is pivotally connected to one of them and detachably connected to the other; (7) a shaking unit associated with each boom and comprising a limb shaking head, its associated motor supplied with current from the generator and connected by suitable gearing to the shaking head and a handle for positioning the shaking head and which may carry a manually operated switch for controlling the operation of the motor; and (8) a retractile supporting spring for each shaking head which is hung from a horizontal leg of the boom in a manner such that it may be moved into a desired position lengthwise of the leg, moved angularly in any direction to a desired position, and readily stretched to any extent which may be necessary for the application of the shaking head to the limb from which the berries are to be dislodged.

Figure 1:
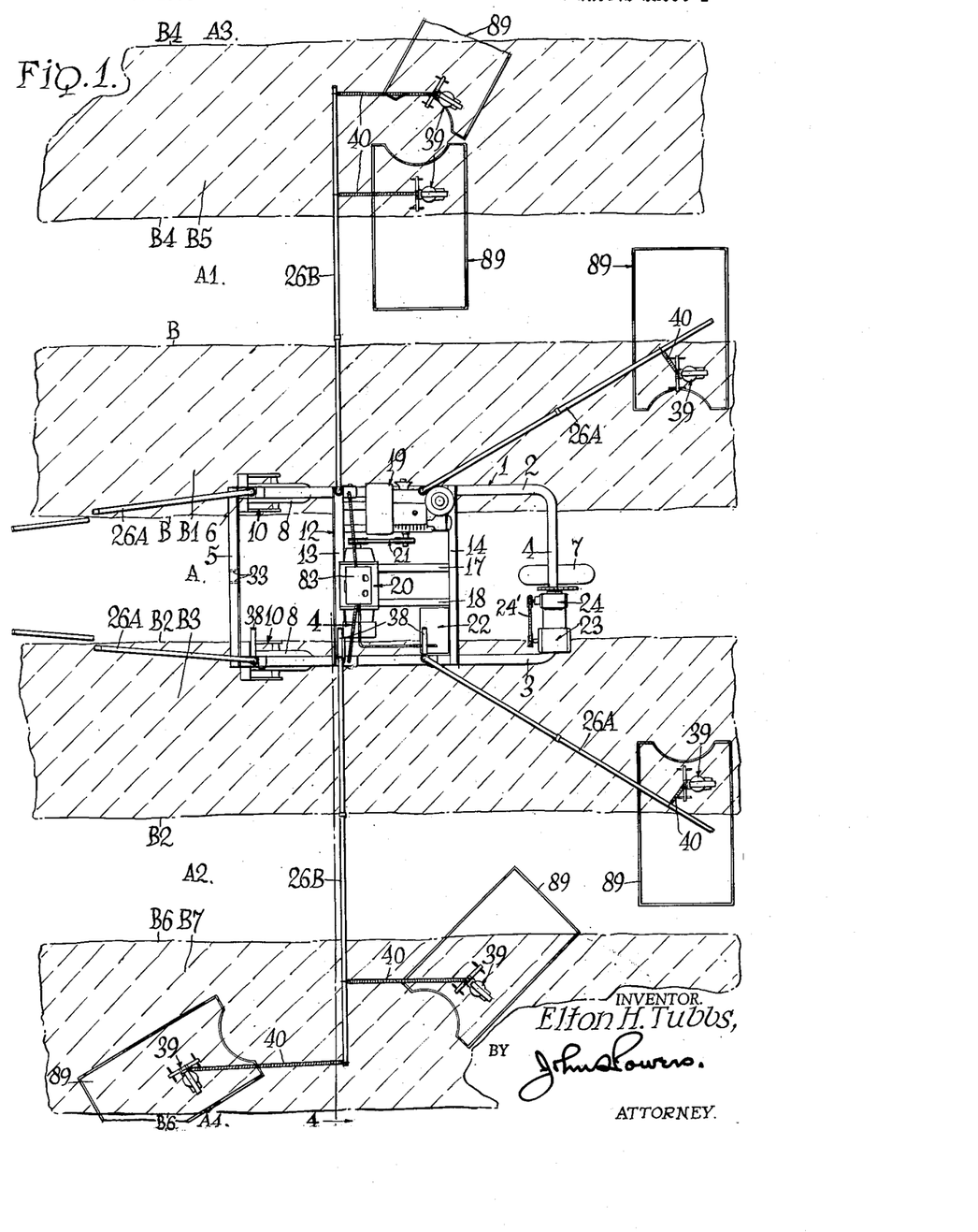
FIGURE 1 is a fragmentary plan view of the machine shown in operation with the gathering receptacles.

In FIGURE 1 the two dot and dash lines B are indicative of the opposite sides of an inner row of bushes or trees B1, sufficiently suggested by broken lines extending between the lines B and the two dot and dash lines B2 are similarly indicative of the opposite sides of an adjacent inner row of bushes or trees B3, similarly suggested. Between these adjacent rows there is an aisle A. In like manner the two dot and dash lines B4 are indicative of the opposite sides of an outer row of bushes or trees B5, similary suggested and adjacent the inner row B1 and the two dot and dash lines B6 are similarly indicative of the opposite sides of an outer row of bushes or trees B7, similarly suggested and adjacent the inner row B3. Between the outer row B5 and the adjacent inner row B1 there is an aisle A1 and between the outer row B7 and the adjacent inner row B3 there is an aisle A2. Beyond the outer row B5 there is an aisle A3 and beyond the outer row B7 there is an aisle A4.

The machine in which the features of the invention are incorporated is self-propelled along the aisle A and in the construction shown includes limb shaking features severally applicable to the four rows of bushes B1, B3, B5 and B7 at the opposite sides thereof, i.e. generally speaking along the opposed pairs of lines B, B2, B4 and B6.

Figures 2, 3:
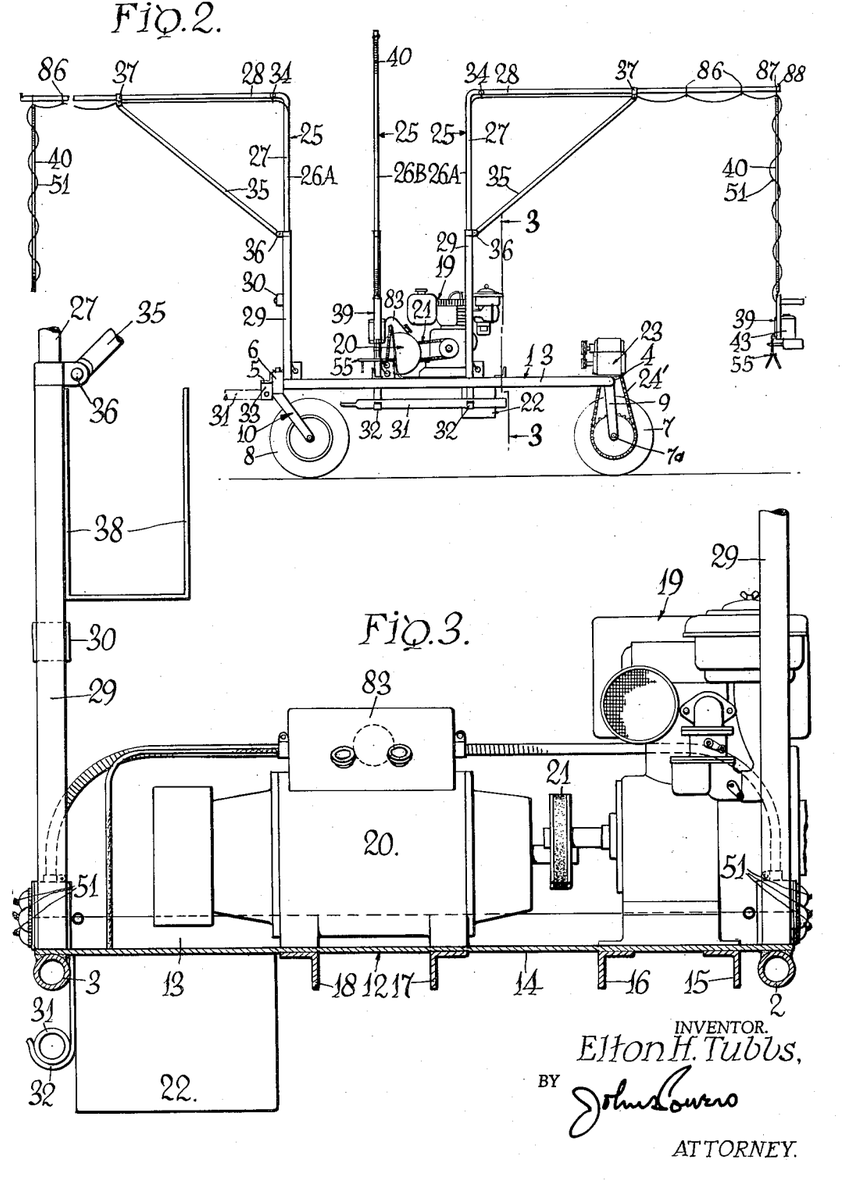
FIGURE 2 is a side elevation of the machine.
FIGURE 3 is an enlarged cross-sectional view taken on the line 3—3 of FIGURE 2.
Figure 4:
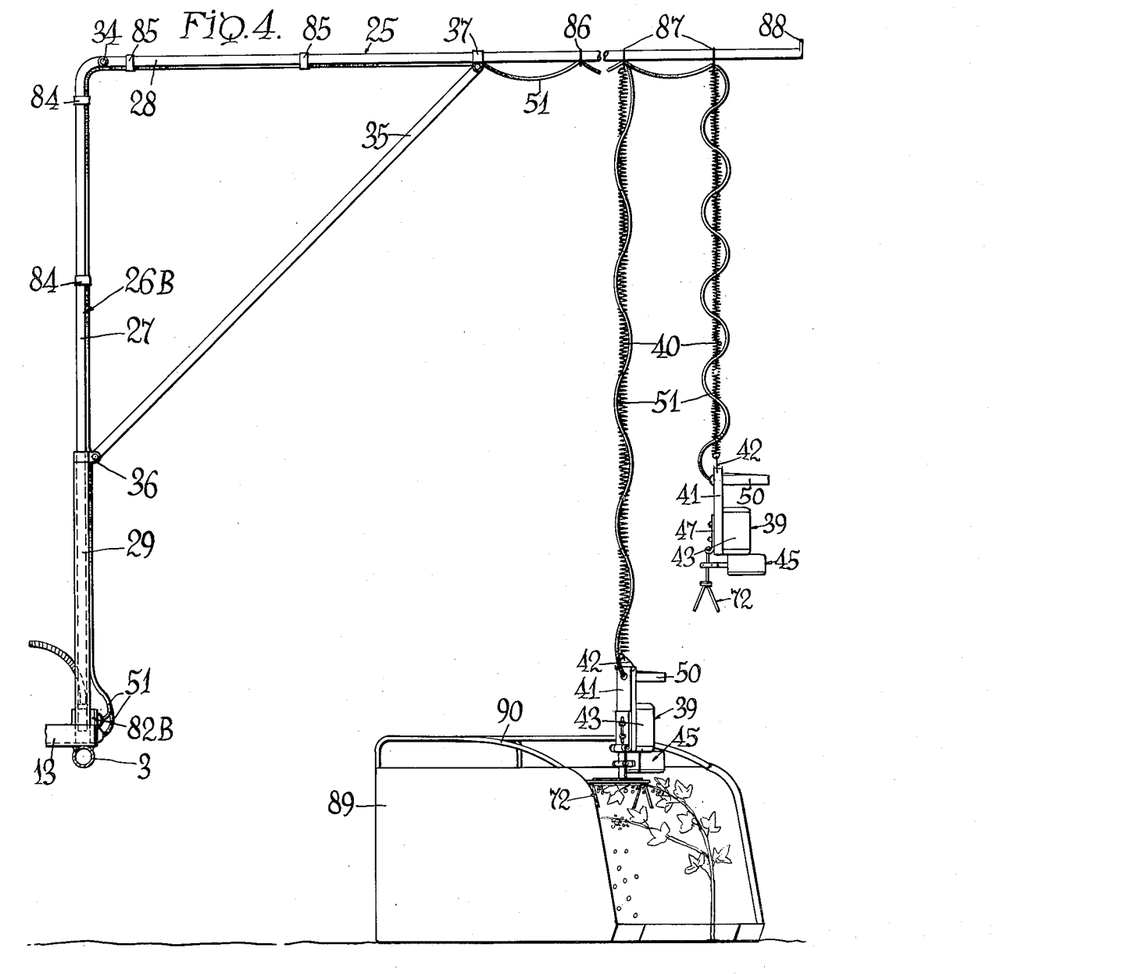
FIGURE 4 is an enlarged cross-sectional view taken on the line 4—4 of FIGURE 1.
Figure 5:
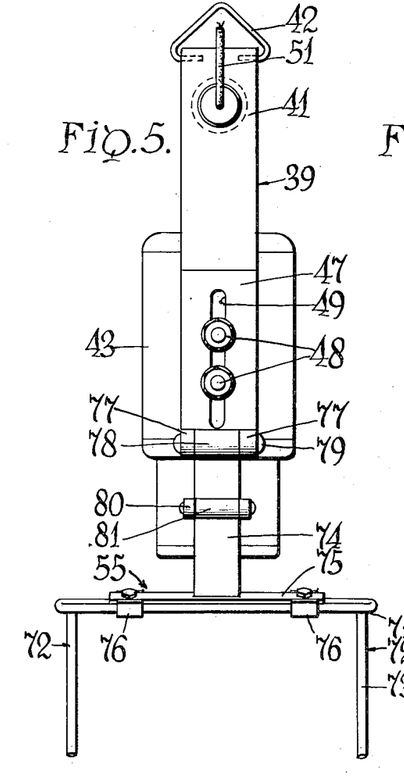
FIGURE 5 is an enlarged front elevation of one of the shaking units.
Figure 6:
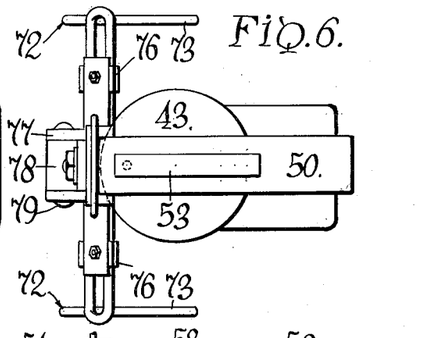
FIGURE 6 is a plan view of a shaking unit.
Figure 7:
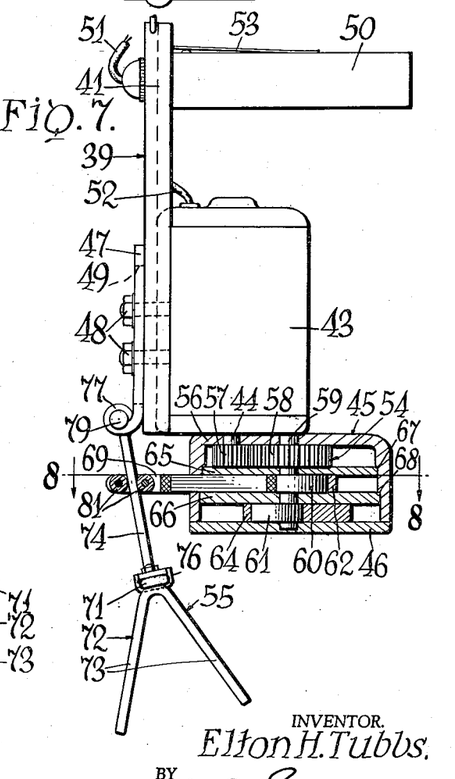
FIGURE 7 is a side elevation of a shaking unit, the housing for the gearing for the reciprocation of the shaking head being shown in vertical section.
Figure 8:
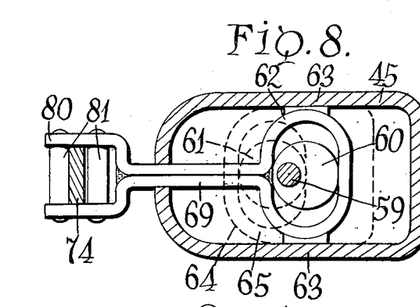
FIGURE 8 is a horizontal sectional view, looking downward, on the line 8—8 of FIGURE 7.

The machine includes a horizontal rectangular main frame 1 having side bars 2 and 3, a rear cross bar 4 and a front cross bar 5. The bars 2, 3 and 4 are preferably of tubular form and integrally connected. The bars 2 and 3 carry at their front end blocks 6 to which they are attached as by welding and these are similarly attached to the front cross bar 5 which is preferably of angle iron form. The frame 1 is wheel supported from the ground, the wheel arrangement preferably consisting of a single rear wheel 7 centrally located relatively to the bar 4 and to which propulsion power is applied and a pair of front wheels 8 located adjacent the bars 2 and 3. The rear wheel 7 is mounted upon an axle 7a and is positioned between parallel arms 9 (one of which is shown in FIGURE 2) to which the axles 7a is terminally connected in the usual manner for an axle mounting, the arms 9 being rigidly connected in depending relation to the rear frame bar 4. The front wheels 8 are utilized in steering and are mounted caster-wise, their axles being journalled in the arms of downwardly and rearwardly extending forks 10, the cross bars of which carry pivot pins 11 which are journalled in the blocks 6.

Figures 9, 10, 11:
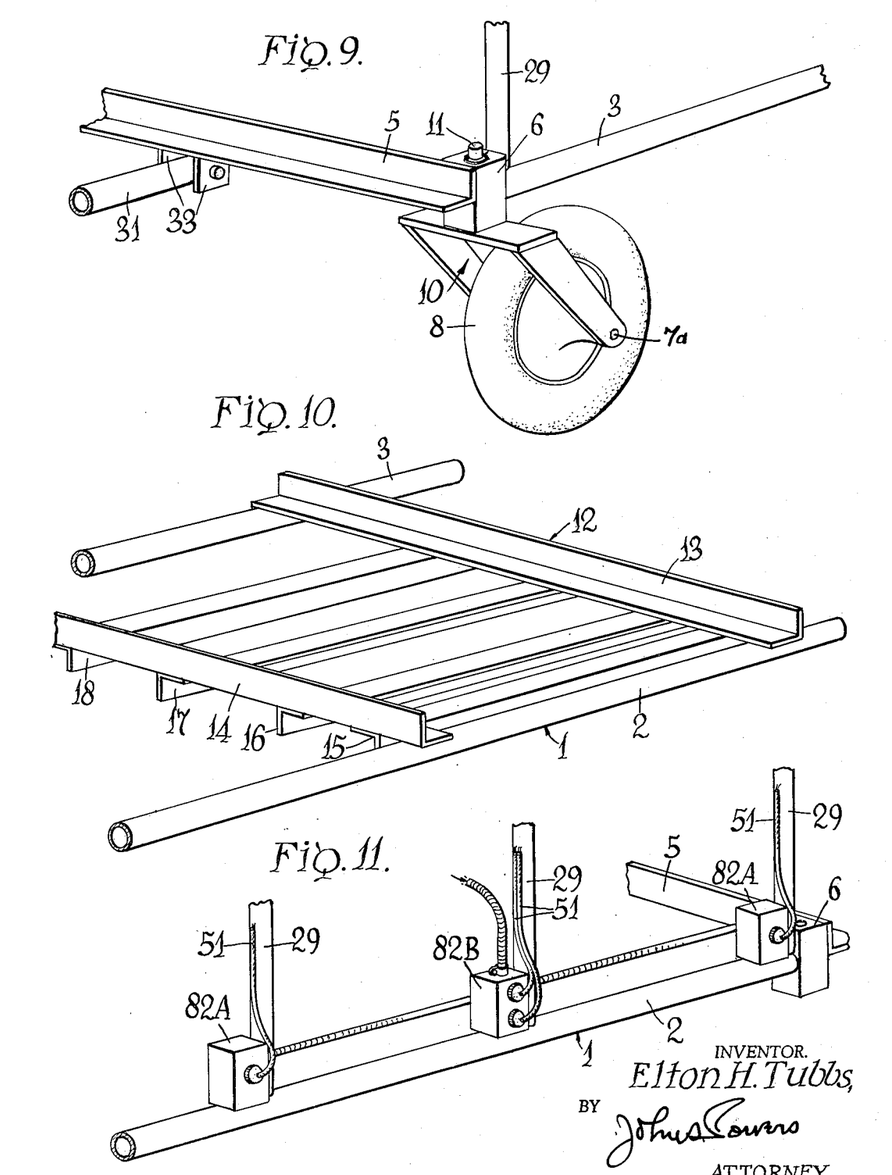
FIGURE 9 is an enlarged fragmentary perspective view of the machine.
FIGURE 10 is an enlarged fragmentary perspective view of the auxiliary frame which is attached to the main frame of the machine and which provides direct support for the power plant features.
FIGURE 11 is an enlarged fragmentary perspective view of one side of the machine.

The machine includes a power plane which is supported upon an auxiliary frame 12 carried by the main frame 1. The frame 12 includes parallel front and rear cross bars 13 and 14 and bars 15, 16, 17 and 18 extending longitudinally between the bars 12 and 13, the several bars of the auxiliary frame being preferably of angle iron section.

The power plant consists of a lightweight internal combustion engine 19, a generator 20 driven from the engine through suitable gearing, e.g. belt gearing 21, and a storage battery 22. The generator delivers current to the storage battery 22 and also to the motors of the shaking units (later to be described). The engine 19 is supported upon the bars 15 and 16 of the auxiliary frame 12. The generator 20 is supported upon the bars 17 and 18. The storage battery 22 is arranged at the underside of the frame 1 and is supported by the rear cross bar 14 of the frame 12.

Propulsive power is applied to the wheel 7 by a motor 23 operating on six or eight volts and to which current is delivered from the battery 22, the motor 23 being operatively connected to the wheel 7 by reduction gearing 24 and chain 24′, details of which are deemed unnecessary to describe.

The limb shaking features designated generally as 25 are assemblies which in each instance include a boom of inverted L-shaped outline which is formed with a vertical leg 27 and a horizontal leg 28 projecting outward from the upper end of the vertical leg. For the support of the booms the frame 1 is provided at appropriate points with upright tubular standards 29, attached to the bars 2 and 3 and in which the vertical legs 27 are journalled, the booms thereby being mounted for unrestricted swinging movement about vertical axes coincident with the legs 27. In the construction shown the machine is provided with six booms, three at each side, four of which, distinguished as 26A, are included in the limb shaking features which are operative on the bushes of the inner rows B1 and B3 and two of which, distinguished as 26B, are included in the limb shaking features which are operative on the bushes of the two outer rows B5 and B7. The booms 26B are similar in construction to the booms 26A, differing however in that their vertical and horizontal legs 27 and 28 are of suitably greater extent, each boom 26B being mounted between the two booms 26A at the corresponding side of the machine.

One of the standards 29 at the front of the machine carries a self-opening push button switch 30 in circuit with the battery 22 and the motor 23 which, when the switch 30 is held closed, is effective through the gearing 24 to propel the machine at a convenient walking speed, that is to say, of the order of three miles per hour. In the operation of the machine a laborer stands at the front end and pushes the switch 30 to closed position whereupon the machine moves forward. Its forward movement is in a series of steps, each of only a few feet corresponding to the distance between the bushes. When the berries have been shaken from a bush the laborer at the front of the machine pushes the button 30 and the machine moves forward until the button is released at which time the machine is ready for operation upon a succeeding bush. If at any time during the movement of the machine it should be necessary to cause it to deviate from a straight path, as in avoiding small obstacles or ground surface irregularities, this is effected by the laborer at the front of the machine who merely grasps the standard 29 which carries the switch 30 and pushes or pulls upon it to the slight extent that may be necessary, the wheels 8 cooperating in the steering function in that they are mounted caster-wise in the forks 10.

For towing the machine from orchard to orchard or to and from the barn a tow bar 31 is provided which, during the use of the machine, is supported by brackets 32, secured to and depending from the frame side bar 3. When it is desired to tow the machine the bar 31 is removed from the brackets 32 and is pivotally fitted at one end between a pair of depending lugs 33 centrally located upon the bar 5, the other end of the bar 31 being suitably connected to the tractor or truck. In order that the machine may be freely towed the reduction gearing 24 includes a removable engaging pin (not shown) which, as removed, permits the sprocket connections to the wheel 7 to run free. When the use of the machine is required the engaging pin is re-inserted, thereby coupling the sprocket connections to the wheel 7 in the train of reduction gearing 24, and the tow bar is restored to its position upon the brackets 32.

The several booms 26A and 26B are collapsible, the legs 27 and 28 being pivotally connected as at 34 adjacent the upper end of the leg 27. During the use of the machine the legs are maintained in right angular relation by a diagonal brace 35 which is pivotally connected as at 36 to the leg 27 adjacent the upper end of the standard 29 in which the leg is journalled and is detachably connected at its remote end to a bracket 37 mounted on the leg 28.

When the machine is to be towed the brace 35 is disconnected from the bracket 37 and is swung downward in parallel relation to the leg 27 and the leg 28 is similarly swung downward about its pivot 34. The booms thus collapsed together with the other elements of the limb shaking features are then placed in supported relation upon U-shaped brackets 38 carried by the standards 29 at one side of the machine, preferably the standards which are carried by the frame side bar 3. When the use of the machine is required the collapsed booms are removed from the brackets 38 and restored to the L-shaped outline in which they are maintained by the braces 35.

The limb shaking feature includes a shaking unit designated generally as 39 and a retractile coil spring 40 which is connected to the unit 39 for its support and is suspended from the leg 28. Each boom 26A carries a single shaking unit 39. Each boom 26B carries two shaking units, each supported by a spring 40.

The shaking units 39 are shown in detail in FIGURES 5 to 8. Each unit includes a supporting bar 41 preferably of channel section and having at its upper end a pivoted loop 42 for connection to the lower end of the associated spring 40. The bar 41 carries a motor 43, an electric motor being shown and preferred. The motor 43 has its shaft 44 positioned vertically and has a gear case 45 attached to the lower end of its casing, the case 45 including a removable bottom plate 46. The motor 43 is clamped to the bar 41, the casing of the motor 43 constituting one element of the clamp and bearing against the outer face of the bar 41 and a strap 47 constituting the other element of the clamp and bearing against the inner face of the bar 41, the clamp being completed by bolt and nut connections 48, the bolts of which extend through openings in the bar 41 and through a vertical slot 49 in the strap 47, thereby to provide for the positional adjustment vertically of the strap 47 with relation to the bar 41. The bar 41 carries near its upper end a suitably attached outwardly extending handle 50 which encloses a suitable switch (not shown), a microswitch being assumed. The switch is connected by wiring 51 to the generator 20 and by wiring 52 to the motor 43. The switch is normally open and has an upwardly projecting part which engages a manually actuated closure element 53, preferably in the form of a leaf spring which tends to spring upward and which, as depressed by finger pressure, closes the switch with the resultant operation of the motor 43. The gearing in the case 45 is designated generally as 54 and effects the operation of the shaking head designated generally as 55. The motor shaft 44 extends through an opening in the top plate 56 of the gear case 45 and carries a spur gear 57 in mesh with a larger spur gear 58 mounted on a vertical shaft 59. The shaft 59 is terminally journalled in the top plate 56 and in the bottom plate 46 and carries opposed upper and lower eccentrics 60 and 61. The eccentric 60 is arranged within a scotch yoke 62 and effects its reciprocation, the yoke being laterally guided by the side walls 63 of the casing 45. The eccentric 61 counterbalances the eccentric 60 and effects the reciprocation of a weighted horizontal frame 64, formed similarly as a scotch yoke and being an idler supported upon the bottom plate 46, its function being merely to counterbalance the yoke 62. The yoke 62 is arranged between and guided by upper and lower horizontal plates 65 and 66, the plate 66 providing support. The plates 65 and 66 are fitted against shoulders 67 and 68 and are removably secured to the walls of the case 45, the lower shoulder 68 for the purpose of assembly being of greater dimensions than the upper shoulder 67. The yoke 62 is fashioned to provide a projecting arm 69 which extends through an opening in the inner vertical wall of the case 45 and is operatively connected to the shaking head 55.

The shaking head 55 includes a horizontal bar 71 which extends transversely with reference to the axis of movement of the arm 69 and carries at its ends limb straddling and engaging members 72 of inverted V-shape, the arms 73 of which embrace the limb and extend at opposite sides thereof. The bar 71 is carried by a generally vertical hanger strap 74 provided at its lower end with a horizontal bar 75 to which the bar 71 is attached by suitable clips 76. The strap 74 is pivotally hung from the clamping strap 47, the connections comprising spaced apertured ears 77 at the lower end of the clamping strap 47, an apertured ear 78 at the upper end of the strap 74 and which is located in alined relation between the ears 77 and a pivot pin 79 extending through the ears 77 and 78. The arm 69 is operatively related to the strap 74 and for this purpose has at its outer end a yoke 80 which carries parallel rollers 81 between which the arm 74 extends. It will be apparent that when the yoke 62 is reciprocated the strap 74 will be oscillated through a relatively short path, the oscillation being extremely rapid with the result that in a matter of one or two seconds all of the berries will be shaken from the limb cradled between the arms 73. The amplitude of throw of the strap 74 is regulated by the positional adjustment of the strap 47.

The wiring 51 which conveys current to the motor 43 of each shaking unit is plugged into a corresponding junction box. These are distinguished as 82A and 82B, and are associated, respectively, with the booms 26A and 26B. In the embodiment disclosed six junction boxes are provided and are mounted upon the side rails 2 and 3 of the frame 1, three at each side of the machine with the junction boxes 82B located between the junction boxes 82A at the same side of the machine. Since the booms 26B carry two shaking units, each having its wiring 51, the corresponding junction boxes 82B are formed with two sockets for the plugs of the two wirings 51 which lead to the respective shaking units. The junction boxes 82A and 82B are electrically connected to a common junction box 83 suitably wired to the generator 20. The wiring 51 extends from its particular junction box along the legs 27 and 28 of the associated boom, being held in parallel relation to the leg 27 by clips 84 attached to the leg and through which it passes loosely and for a part of its length being similarly held in parallel relation to the leg 28 by clips 85 attached to the leg and the bracket 37 to which the brace 35 is attached, depending from the leg 28 for connection to the switch enclosed in the handle 50 of the corresponding shaking unit 39. Beyond the bracket 37 the wiring 51 is relatively slack and is suitably attached to rings 86 which are slideable along the leg 28, the wiring 51 beyond the leg 28 being coiled loosely about the spring 40 which supports the corresponding shaking unit 39. Each spring 40 is formed at its upper end with a ring 87 which encircles and is freely slideable along the leg 28, the wiring 51 being passed through and suitably attached to the ring 87. The leg 28 has at its outer end a projecting stop lug 88 which serves to prevent displacement of the ring 87 and its associated spring 40 from the leg 28.

Figure 12:
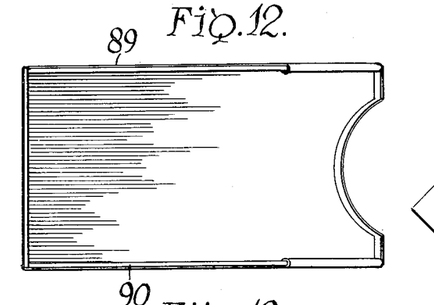
FIGURE 12 is a plan view of one of the receptacles into which the berries fall.
Figure 13:
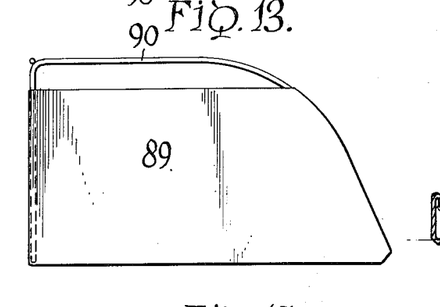
FIGURE 13 is a side elevation of the receptacle shown in FIGURE 12.
Figure 14:
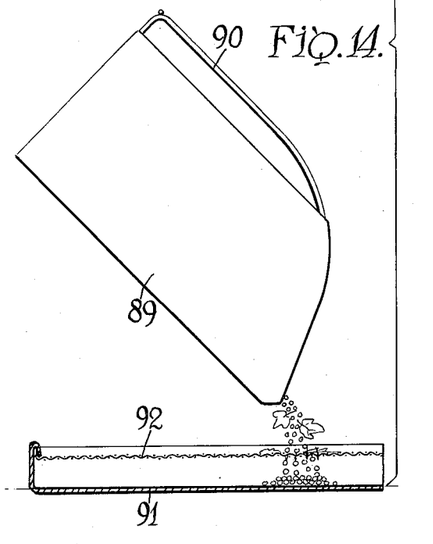
FIGURE 14 is a side elevation of the receptacle shown in FIGURE 12, showing the manner in which it is tilted to discharge the berries, this figure also including a sectional view of a berry receiving pan having a screen by which the berries are separated from any leaves or twigs that may fall with them into the receptacle.

Open top and open front receptacles 89 are placed upon the ground at opposite sides of each row of bushes or trees from which the berries are to be shaken, the bottom wall of each receptacle preferably being formed to enable the receptacle to be placed in adjoining relation to the trunk of the bush or tree and the berries falling directly into the receptacles. The receptacles 89 are each provided with handles 90 by which they may be picked up and carried from point to point or may be tilted into position to discharge the accumulated supply of berries through the open front.

Figure 15:
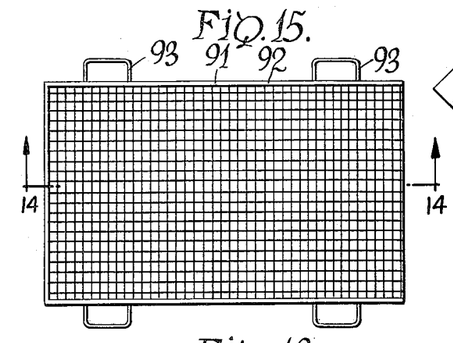
FIGURE 15 is a plan view of the berry receiving pan.
Figure 16:
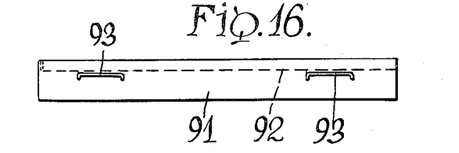
FIGURE 16 is a side elevation of the berry receiving pan.
Figure 17:
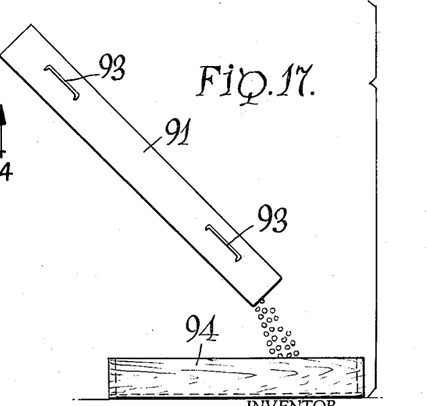
FIGURE 17 is a side elevation of the berry receiving pan showing the manner in which it is tilted to discharge the berries and also showing the box into which the berries are poured from the receiving pan and whch is used in the distribution of the berries to customers.

Leaves and twigs will fall into the receptacles 89 along with berries and in order to effect their separation berry receiving pans 91 are utilized, each having an open front and having near their top a screen 92 of appropriate mesh through which the berries fall, the leaves and twigs remaining upon the top of the screen from which they are readily removed. The pans 91 are provided along their side walls with handles 93 by which they may be moved from place to place and tilted to discharge the berries through their open fronts into receptacles 94 in which the berries may be shipped to the purchaser.

The boxes 89 may be positioned according to optimum convenience in relation to existing conditions. For example in FIGURE 1, the boxes adjacent the opposite sides of the row B5 are respectively positioned in the aisles A1 and A3 and in adjoining relation to the trunk of the same tree or bush whereas the boxes 89 adjacent the opposite sides of the row B7 are positioned respectively in the aisles A2 and A4 and are in adjoining relation to the trunks of different trees or bushes; and the boxes associated with the limb shaking features 25 at the right (the drawings being considered) are positioned in the aisles A1 and A2 respectively and are adjacent the outer sides of the respective rows B1 and B3 and the boxes at the left, (the drawings being considered) illustration of which is deemed unnecessary, are both located in the aisle A adjacent the inner sides of the respective rows B1 and B3.

The pivotal mounting of the boom legs 27 enables the booms to be freely moved to any position which may be appropriate for the desired angularity of the legs 28. The slideable mounting of the springs 40 upon the legs 28 in connection with the slackness of the wiring 51 enables the spring to be readily and freely moved to any desired position along the length of the legs 28. The springs 40 as suspended from the legs 28 by the rings 87 may be moved angularly in any desired direction and in connection with the slackness of the wiring 51 may be stretched or relaxed to any desired extent. These movements of the booms and of the springs are conveniently effected by means of the handle 50 as an element of the shaking unit 39. The bar 41 of the shaking unit by means of its suspension from the springs 40 by the loop 42 may likewise be moved in any desired angular direction. It follows that the laborer assigned to a particular shaking unit 39 may readily move the shaking head 55 to any position desired with reference to the limb of the bush or tree which is to be embraced by the arms 72 for the purpose of the shaking operation whereupon by actuating the switch closure element 53 he causes the motor 43 to effect the shaking operation.

The receptacles 89 are light in weight and in the harvesting operation are readily moved by the laborers from bush to bush and readily placed in the desired position with reference to the bush from which the berries are to be shaken. Each laborer may also take care of emptying the receptacles 89 into the receiving pans 91 which are placed at predetermined positions in the aisle, these likewise being moved from point as required, and being emptied from time to time into receptacles 94, likewise placed at predetermined positions in the aisle.

As shown in FIGURES 1 and 2 the legs 27 and 28 of the several booms are connected by the brace 35 and the machine is ready for operation. Upon completion of the harvesting operation the brace 35 is detached from the bracket 37 and together with the leg 28 is folded in parallel relation to the leg 27, which is then withdrawn from its supporting standard 29. With the legs 27 and 28 and the brace 35 thus folded the spring 40 is also moved in parallel relation to the leg 27 and all of the limb shaking features as thus collapsed are placed upon the brackets 38 whereupon the machine is ready for towing by the bar 31. When moved to the berry patch or orchard from which the berries will be harvested the parts of the shaking features 25 are restored to their operative condition as shown in FIGURES 1 and 2 in which the legs 27 are mounted within the corresponding standards 29.

The generator and the wiring from the generator to the motors 43 of the shaking units of course include a grounded neutral wire as a matter of safety and in accordance with established practice, the circuits involved being well known in the electrical art and illustration thereof being deemed unnecessary.

I claim:

1. A machine for harvesting berries comprising, in combination: a frame having ground engaging supporting wheels and movable in adjacency to a row of berry bearing bushes or trees; a limb shaking assembly carried by the frame and including a boom of inverted L-shape having a vertical leg and a horizontal leg projecting from the upper end of the vertical leg, a shaking unit suspended from the horizontal leg, and means pendent from the horizontal leg to the lower end of which the shaking unit is connected for support, the means being pivotally connected to the horizontal leg for movement in any angular direction, also pivotally connected to the shaking unit to permit its movement in any direction, and constructed for elongation or contraction, the shaking unit comprising a limb embracing shaking head, an electric motor having a shaft and a casing, gearing and driving means within the casing, the gearing and driving means connecting the shaft of the electric motor and the shaking head and operative to effect the rapid reciprocation of the shaking head, a handle carried by the shaking unit and by means of which it may be held and manipulated by an operator, such manipulation involving the angular movement of said means relative to the horizontal leg, the elongation or contraction of said means, and the angular movement of the shaking unit relative to said means and a manually controlled normally open switch for initiating and arresting the operation of the electric motor; means on the frame for mounting the boom upon the frame for unrestricted pivotal movement about an axis coincident with the axis of the vertical leg; and a source of electric current carried by the frame and in circuit with the switch and motor of the shaking unit.

2. A machine as set forth in claim 1 wherein the means pendent from the horizontal leg comprises a retractile coil spring and the pivotal connection of the spring to the horizontal leg includes a ring slideably mounted upon the horizontal leg.

3. A machine as set forth in claim 1 wherein the shaking unit includes a supporting bar connected to the lower end of the means pendent from the horizontal leg, the gearing for the reciprocation of the shaking head includes a case which is attached to and carried by the casing of the electric motor included in the shaking unit and the motor is secured to the supporting bar with its shaft in a vertical position and the case for the gearing is arranged below the motor.

4. A machine as set forth in claim 1 wherein the gearing for the operation of the shaking head operates a reciprocatory element having a terminal yoke provided with spaced parallel rollers and the shaking head is directly supported by a pivotally suspended strap which extends between the rollers, the reciprocations of the element thereby effecting oscillations of the shaking head.

5. A machine as set forth in claim 1 wherein the shaking unit includes a supporting bar connected to the lower end of the means pendent from the horizontal leg, the gearing for the operation of the shaking head includes a reciprocatory element having a terminal yoke provided with spaced parallel rollers, a vertical strap is secured to the supporting bar and is positionally adjustable vertically, a second strap extends between the rollers and is pivotally connected to the lower end of the vertical strap, and the shaking head is directly supported at the lower end of the second strap, the reciprocation of the element thereby effecting oscillations of the shaking head, the amplitude of the oscillations being regulated by the positional adjustment of the vertical strap.

6. A machine as set forth in claim 1 wherein the horizontal leg of the boom is pivotally connected to the upper end of its vertical leg for folding movement into a position in which it is substantially parallel to the vertical leg and a diagonal brace extends between the vertical and horizontal legs and is pivotally connected to one of them and detachably connected to the other, the brace being foldable in substantially parallel relation to the leg to which it is pivotally connected.

7. A machine as set forth in claim 1 wherein the horizontal leg of the boom is pivotally connected to the upper end of its vertical leg for folding movement into a position in which it is substantially parallel to the vertical leg, a diagonal brace extends between the vertical and horizontal legs and is pivotally connected to one of them and detachably connected to the other, the brace being foldable in substantially parallel relation to the leg to which it is pivotally connected, and the means pendant from the horizontal leg together with the shaking unit in attached relation is foldable in substantially parallel relation to the horizontal leg in its folded relation to the vertical leg.

8. A machine as set forth in claim 1 wherein the shaking unit includes a supporting bar connected to the lower end of the means pendant from the horizontal leg, the handle is attached to the supporting bar and the normally open switch for initiating and arresting the operation of the motor of the shaking unit has a manually actuated element carried by the handle.

9. A machine for harvesting berries comprising in combination: a horizontal frame having ground engaging supporting wheels and moveable in adjacency to a row of berry bearing bushes or trees; a boom carried by the frame and having an elevated horizontal leg; a shaking unit; means for the suspension of the shaking unit connected to the horizontal leg for manually effected movement in any angular direction, also pivotally connected to the shaking unit to permit the manually effected movement of the shaking unit in any direction, and constructed for manually effected elongation or contraction; the shaking unit comprising a limb embracing shaking head mounted for deciprocatory movement, an electric motor, gearing operatively connected to the shaft of the electric motor and to the shaking head and operative to effect a rapid reciprocation of the shaking head; a handle on the shaking unit by means of which the shaking unit may be held and manipulated by an operator and a manually controlled switch associated with the shaking unit for initiating and arresting the operation of the electric motor; and a source of electric current connected to the frame for movement therewith and in circuit with the switch and motor of the shaking unit.

10. In a machine for harvesting berries, in operative combination with a remotely located source of power, a shaking unit comprising, in combination: a supporting bar; a shaking head carried by the bar and mounted for reciprocatory movement, the shaking head being provided with limb straddling and engaging members; a motor carried by the bar and supplied with power from the remotely located source, the motor having a vertical shaft and a casing; gearing for the operation of the shaking head and operatively connected to it and to the shaft of the motor; a case for the gearing connected to the casing of the motor; a handle connected to the supporting bar by means of which the unit may be manipulated by an operator; and a manually actuated element carried by the handle for controlling the flow of power to the motor, thereby to initiate and arrest its operation.

11. A machine as set forth in claim 10 wherein the gearing for the operation of the shaking head operates a reciprocatory element having a terminal yoke provided with spaced parallel rollers; a vertical strap is pivotally suspended from the bar and extends in engaging relation between the rollers; and the limb straddling and engaging members are carried by the strap.

12. A machine as set forth in claim 10 wherein the gearing for the operation of the shaking head operates a reciprocatory element having a terminal yoke provided with spaced parallel rollers; a vertical strap is secured to the supporting bar and is positionally adjustable vertically; a second strap extends in engaging relation between the rollers and is pivotally connected to the lower end of the vertical strap; and the limb straddling and engaging members are carried by the second strap.

References Cited in the file of this patent

UNITED STATES PATENTS

| | | |
|---|---|---|
| 1,426,326 | Stukenborg | Aug. 15, 1922 |
| 1,483,248 | Stukenborg | Feb. 12, 1924 |
| 1,626,068 | Bartlett | Apr. 26, 1927 |
| 2,521,491 | Stukenborg | Sept. 5, 1950 |
| 2,692,470 | Boman | Oct. 26, 1954 |
| 2,700,268 | Lowe | Jan. 25, 1955 |
| 2,787,111 | Templeton | Apr. 2, 1957 |